(12) United States Patent
He et al.

(10) Patent No.: US 10,607,119 B2
(45) Date of Patent: Mar. 31, 2020

(54) UNIFIED NEURAL NETWORK FOR DEFECT DETECTION AND CLASSIFICATION

(71) Applicant: KLA-Tencor Corporation, Milpitas, CA (US)

(72) Inventors: Li He, San Jose, CA (US); Mohan Mahadevan, Santa Clara, CA (US); Sankar Venkataraman, Milpitas, CA (US); Huajun Ying, San Jose, CA (US); Hedong Yang, Santa Clara, CA (US)

(73) Assignee: KLA-Tencor Corp., Milpitas, CA (US)

( * ) Notice: Subject to any disclaimer, the term of this patent is extended or adjusted under 35 U.S.C. 154(b) by 260 days.

(21) Appl. No.: 15/697,426

(22) Filed: Sep. 6, 2017

(65) Prior Publication Data

US 2019/0073568 A1 Mar. 7, 2019

(51) Int. Cl.
*G06K 9/62* (2006.01)
*G06T 7/00* (2017.01)
*G06K 9/46* (2006.01)

(52) U.S. Cl.
CPC ............. *G06K 9/6267* (2013.01); *G06K 9/46* (2013.01); *G06K 9/6253* (2013.01); *G06K 9/6255* (2013.01); *G06K 9/6256* (2013.01); *G06T 7/001* (2013.01); *G06T 7/0006* (2013.01); *G06T 2207/10061* (2013.01); *G06T 2207/20081* (2013.01); *G06T 2207/20084* (2013.01); *G06T 2207/30148* (2013.01)

(58) Field of Classification Search
None
See application file for complete search history.

(56) References Cited

U.S. PATENT DOCUMENTS

| | | |
|---|---|---|
| 7,570,796 B2 | 8/2009 | Zafar et al. |
| 7,583,832 B2 | 9/2009 | Okuda et al. |
| 7,676,077 B2 | 3/2010 | Kulkarni et al. |
| 8,126,255 B2 | 2/2012 | Bhaskar et al. |
| 8,664,594 B1 | 4/2014 | Jiang et al. |
| 8,692,204 B2 | 4/2014 | Kojima et al. |
| 8,698,093 B1 | 4/2014 | Gubbens et al. |
| 8,716,662 B1 | 5/2014 | MacDonald et al. |
| 9,222,895 B2 | 12/2015 | Duffy et al. |

(Continued)

OTHER PUBLICATIONS

International Search Report for PCT/US2018/049612 dated Dec. 19, 2018.

(Continued)

*Primary Examiner* — Fayyaz Alam
(74) *Attorney, Agent, or Firm* — Ann Marie Mewherter

(57) ABSTRACT

Methods and systems for detecting and classifying defects on a specimen are provided. One system includes one or more components executed by one or more computer subsystems. The one or more components include a neural network configured for detecting defects on a specimen and classifying the defects detected on the specimen. The neural network includes a first portion configured for determining features of images of the specimen generated by an imaging subsystem. The neural network also includes a second portion configured for detecting defects on the specimen based on the determined features of the images and classifying the defects detected on the specimen based on the determined features of the images.

26 Claims, 8 Drawing Sheets

(56) References Cited

U.S. PATENT DOCUMENTS

| | | | | |
|---|---|---|---|---|
| 2005/0002560 | A1* | 1/2005 | Yamamoto | G06K 9/3233 |
| | | | | 382/156 |
| 2015/0170002 | A1 | 6/2015 | Szegedy et al. | |
| 2016/0163035 | A1* | 6/2016 | Chang | G06K 9/4628 |
| | | | | 382/149 |
| 2016/0328837 | A1* | 11/2016 | He | G06T 7/0004 |
| 2017/0017793 | A1 | 1/2017 | Davis et al. | |
| 2017/0140524 | A1 | 5/2017 | Karsenti et al. | |
| 2017/0148226 | A1 | 5/2017 | Zhang et al. | |
| 2017/0193400 | A1 | 7/2017 | Bhaskar et al. | |
| 2017/0193680 | A1 | 7/2017 | Zhang et al. | |
| 2017/0194126 | A1 | 7/2017 | Bhaskar et al. | |
| 2017/0200260 | A1 | 7/2017 | Bhaskar et al. | |
| 2017/0200264 | A1 | 7/2017 | Park et al. | |
| 2017/0200265 | A1 | 7/2017 | Bhaskar et al. | |
| 2018/0101944 | A1* | 4/2018 | Sakai | G06T 7/0004 |
| 2018/0293722 | A1* | 10/2018 | Crocco | G06T 7/0004 |

OTHER PUBLICATIONS

Hand et al., "Principles of Data Mining (Adaptive Computation and Machine Learning)," MIT Press, Aug. 1, 2001, 578 pages.

He et al., "Deep Residual Learning for Image Recognition," arXiv:1512.03385v1, Dec. 10, 2015, 12 pages.

He et al., "Spatial Pyramid Pooling in Deep Convolutional Networks for Visual Recognition," IEEE Transactions on Pattern Analysis and Machine Intelligence (TPAMI), vol. 37, No. 9, Sep. 2015, pp. 1904-1916.

Jebara, "Discriminative, Generative, and Imitative Learning," MIT Thesis, Feb. 2002, 212 pages.

Krizhevsky et al., "ImageNet Classification with Deep Convolutional Neural Networks," NIPS, Jan. 2012, 9 pages.

Ren et al., "Faster R-CNN: Towards Real-Time Object Detection with Region Proposal Networks" Neural Information Processing Systems (NIPS) 2015, Jun. 4, 2015, 9 pages.

Simonyan et al., "Very Deep Convolutional Networks for Large-Scale Image Recognition," presented at International Conference on Learning Representations (ICLR) 2015, Apr. 10, 2015, 14 pages.

Sugiyama, "Introduction to Statistical Machine Learning," Morgan Kaufmann, Oct. 9, 2015, 534 pages.

Szegedy et al., "Going Deeper with Convolutions," 2015 IEEE Conference on Computer Vision and Pattern Recognition (CVPR), Jun. 2015, 9 pages.

U.S. Appl. No. 15/603,249 by Zhang et al. filed May 23, 2017 (submitted as U.S. Patent Application Publication No. 2017/0345140 published Nov. 30, 2017).

* cited by examiner

UNIFIED NEURAL NETWORK FOR DEFECT DETECTION AND CLASSIFICATION

BACKGROUND OF THE INVENTION

1. Field of the Invention

The present invention generally relates to methods and systems configured for using a unified neural network for defect detection and classification.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on specimens to drive higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

Defect review typically involves re-detecting defects detected as such by an inspection process and generating additional information about the defects at a higher resolution using either a high magnification optical system or a scanning electron microscope (SEM). Defect review is therefore performed at discrete locations on specimens where defects have been detected by inspection. The higher resolution data for the defects generated by defect review is more suitable for determining attributes of the defects such as profile, roughness, more accurate size information, etc. Defects can generally be more accurately classified into defect types based on information determined by defect review compared to inspection.

Advances in deep learning have made deep learning an attractive framework for use in defect detection and classification. Current approaches for using deep learning frameworks for defect detection and classification have solved each of these problems independently. For example, for classification, in training, a user may assign image level labels to defect images. Image level labels and defect images are used to train a convolutional neural network (CNN). During production (after training), with defect images as an input to the CNN, the CNN will output image classification and confidence associated with the image classification. In addition, for detection, a user may assign pixel level labels to defect images (multiple classes of defect images typically). Pixel level labels and defect images are used to train a detection CNN, which is different than the CNN that is trained for defect classification. In other words, the detection CNN and the classification CNN are mutually exclusive. Output from the detection CNN (blobs) and blob level labels may be used to train the classification CNN. During production (after training of the detection CNN), defect images are input to the detection CNN, which outputs blobs, and the classification CNN outputs per blob classification and associated confidence.

There are, however, a number of disadvantages to the currently used methods and systems described above. For example, the ease of use of the currently used methods is disadvantageous. In particular, there is a significantly high burden on the user to annotate defects at the pixel level for the detection network to learn. In addition, there is a substantially high training cost due to the substantially long training time and training defects requirement for three networks. In another example, the lack of knowledge sharing of the currently used methods is disadvantageous. In particular, in the currently used methods, it is difficult to use prior knowledge. For example, the user needs to annotate the pixels of a substantially large amount of previous data to obtain pre-trained weights for a network. In addition, the currently used methods require obtaining separate pre-trained weights for different networks for classification and detection. Furthermore, the currently used approaches do not take what is learned in the classification network for detection for maximal performance. In an additional example, the currently used frameworks treat detection and classification as separate problems thereby increasing the training cost. In a further example, the currently used approaches make it difficult to scale to newer technologies as the global roadmap for deep learning evolves. In yet another example, the cost of the currently used methods is disadvantageous. In particular, the image computer cost is substantially high due to the separate training processes.

Accordingly, it would be advantageous to develop systems and methods for detecting and classifying defects on a specimen that do not have one or more of the disadvantages described above.

SUMMARY OF THE INVENTION

The following description of various embodiments is not to be construed in any way as limiting the subject matter of the appended claims.

One embodiment relates to a system configured to detect and classify defects on a specimen. The system includes one or more computer subsystems and one or more components executed by the one or more computer subsystems. The one or more components includes a neural network configured for detecting defects on a specimen and classifying the defects detected on the specimen. The neural network includes a first portion configured for determining features of images of the specimen generated by an imaging subsystem. The neural network also includes a second portion configured for detecting defects on the specimen based on the determined features of the images and classifying the defects detected on the specimen based on the determined features of the images. The one or more computer subsystems are configured for generating results of the detecting and classifying. The system may be further configured as described herein.

An additional embodiment relates to another system configured to detect and classify defects on a specimen. This system is configured as described above. This system also includes an imaging subsystem configured for generating images of a specimen. The computer subsystem(s) are, in this embodiment, configured for acquiring the images. This embodiment of the system may be further configured as described herein.

Another embodiment relates to a computer-implemented method for detecting and classifying defects on a specimen. The method includes acquiring images of a specimen generated by an imaging subsystem. The method also includes determining features of the images of the specimen by inputting the images into a first portion of a neural network configured for detecting defects on the specimen and classifying the defects detected on the specimen. One or more components are executed by one or more computer systems, and the one or more components include the neural network. In addition, the method includes detecting defects on the specimen based on the determined features of the images and classifying the defects detected on the specimen based on the determined features of the images by inputting the determined features of the images into a second portion of the neural network. The method further includes generating results of the detecting and classifying.

Each of the steps of the method described above may be further performed as described further herein. In addition, the embodiment of the method described above may include any other step(s) of any other method(s) described herein. Furthermore, the method described above may be performed by any of the systems described herein.

Another embodiment relates to a non-transitory computer-readable medium storing program instructions executable on one or more computer systems for performing a computer-implemented method for detecting and classifying defects on a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
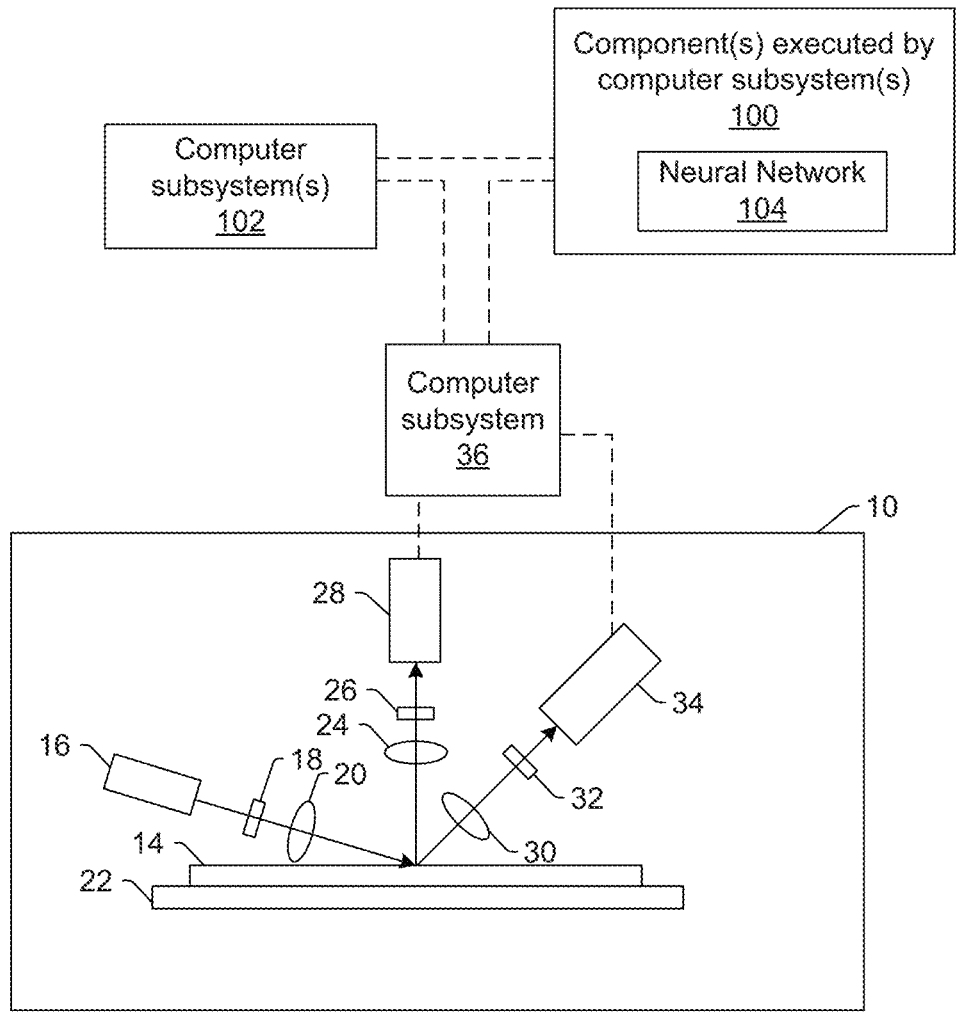
FIGS. 1 and 1a are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The terms "design," "design data," and "design information" as used interchangeably herein generally refer to the physical design (layout) of an IC and data derived from the physical design through complex simulation or simple geometric and Boolean operations. In addition, an image of a reticle acquired by a reticle inspection system and/or derivatives thereof can be used as a "proxy" or "proxies" for the design. Such a reticle image or a derivative thereof can serve as a substitute for the design layout in any embodiments described herein that use a design. The design may include any other design data or design data proxies described in commonly owned U.S. Pat. No. 7,570,796 issued on Aug. 4, 2009 to Zafar et al. and U.S. Pat. No. 7,676,077 issued on Mar. 9, 2010 to Kulkarni et al., both of which are incorporated by reference as if fully set forth herein. In addition, the design data can be standard cell library data, integrated layout data, design data for one or more layers, derivatives of the design data, and full or partial chip design data.

In addition, the "design," "design data," and "design information" described herein refers to information and data that is generated by semiconductor device designers in a design process and is therefore available for use in the embodiments described herein well in advance of printing of the design on any physical specimens such as reticles and wafers.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a system configured to detect and classify defects on a specimen. As described further herein, the embodiments provide a unified deep learning framework for review and inspection (e.g., election beam (or e beam) review and inspection). Defect detection and automatic defect classification (ADC) have become extremely important in current semiconductor fabrication. Some currently proposed deep learning based detection has hit the 4 nm sensitivity for e beam, and proposed deep learning based classification has achieved the holy grail of 90% accuracy and purity with a relatively high level of ease of use.

As described further herein, however, currently used approaches have solved each of these problems independently, which creates several disadvantages for such approaches. For example, such an independent approach encounters some aspects of the training cost twice. Furthermore, each piece is unable to take advantage of information from the other thereby impacting performance as well. The annotation cost (i.e., annotating images for training) for detection is relatively high, and reducing the amount of annotation is of substantially high value in enabling this exciting and relatively high performance deep learning based detection and classification.

The new unified approaches described herein have a number of advantages over the currently used approaches. For example, the unified approaches described herein enable applying learning from classification to the harder detection problem. In another example, the unified approaches described herein significantly reduce the burden on the user to annotate defects at the pixel level for the detection network to learn. In an additional example, the unified approaches described herein reduce the training time for both networks. Furthermore, the new unified approaches described herein allow scaling of networks as the global technology roadmap evolves in the field of deep networks. In addition, the configurations described herein provide an extremely elegant way of setting up this framework. The proposed unified deep learning frameworks described herein can also be extended to a variety of inspection, review, and other tools such as those commercially available from KLA-Tencor, Milpitas, Calif.

One embodiment of a system configured to detect and classify defects on a specimen is shown in FIG. 1. The system includes one or more computer subsystems (e.g., computer subsystem 36 and computer subsystem(s) 102) and one or more components 100 executed by the one or more computer subsystems. In some embodiments, the system includes imaging system (or subsystem) 10 configured for generating images of a specimen. In the embodiment of FIG. 1, the imaging subsystem is configured for scanning light over or directing light to a physical version of the specimen while detecting light from the specimen to thereby generate the images for the specimen. The imaging subsystem may also be configured to perform the scanning (or directing) and the detecting with multiple modes.

In one embodiment, the specimen is a wafer. The wafer may include any wafer known in the art. In another embodiment, the specimen is a reticle. The reticle may include any reticle known in the art.

In one embodiment, the imaging subsystem is configured as an optical based imaging system. In this manner, in some embodiments, the images are generated by an optical based imaging system. In one such example, in the embodiment of the system shown in FIG. 1, optical based imaging subsystem 10 includes an illumination subsystem configured to direct light to specimen 14. The illumination subsystem includes at least one light source. For example, as shown in FIG. 1, the illumination subsystem includes light source 16. In one embodiment, the illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen.

The imaging subsystem may be configured to direct the light to the specimen at different angles of incidence at different times. For example, the imaging subsystem may be configured to alter one or more characteristics of one or more elements of the illumination subsystem such that the light can be directed to the specimen at an angle of incidence that is different than that shown in FIG. 1. In one such example, the imaging subsystem may be configured to move light source 16, optical element 18, and lens 20 such that the light is directed to the specimen at a different oblique angle of incidence or a normal (or near normal) angle of incidence.

In some instances, the imaging subsystem may be configured to direct light to the specimen at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, in some instances, optical element 18 may be configured as a spectral filter and the properties of the spectral filter can be changed in a variety of different ways (e.g., by swapping out the spectral filter) such that different wavelengths of light can be directed to the specimen at different times. The illumination subsystem may have any other suitable configuration known in the art for directing the light having different or the same characteristics to the specimen at different or the same angles of incidence sequentially or simultaneously.

In one embodiment, light source 16 may include a broadband plasma (BBP) light source. In this manner, the light generated by the light source and directed to the specimen may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, it is to be understood that, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the imaging subsystem may be configured to alter one or more of the elements of the illumination subsystem based on the type of illumination to be used for imaging.

The imaging subsystem may also include a scanning subsystem configured to cause the light to be scanned over the specimen. For example, the imaging subsystem may include stage 22 on which specimen 14 is disposed during inspection. The scanning subsystem may include any suitable mechanical and/or robotic assembly (that includes stage 22) that can be configured to move the specimen such that the light can be scanned over the specimen. In addition, or alternatively, the imaging subsystem may be configured such that one or more optical elements of the imaging subsystem perform some scanning of the light over the specimen. The light may be scanned over the specimen in any suitable fashion such as in a serpentine-like path or in a spiral path.

The imaging subsystem further includes one or more detection channels. At least one of the one or more detection channels includes a detector configured to detect light from the specimen due to illumination of the specimen by the subsystem and to generate output responsive to the detected light. For example, the imaging subsystem shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

As further shown in FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the imaging subsystem that includes two detection channels, the imaging subsystem may include a different number of detection channels (e.g., only one detection channel or two or more detection channels). In one such instance, the detection channel formed by collector 30, element 32, and detector 34 may form one side channel as described above, and the imaging subsystem may include an additional detection channel (not shown) formed as another side channel that is positioned on the opposite side of the plane of incidence. Therefore, the imaging subsystem may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the imaging subsystem may also include two or more side channels configured as described above. As such, the imaging subsystem may include at least three channels (i.e., one top channel and two side channels), and each of the at least three channels has its own collector, each of which is configured to collect light at different scattering angles than each of the other collectors.

As described further above, each of the detection channels included in the imaging subsystem may be configured to detect scattered light. Therefore, the imaging subsystem shown in FIG. 1 may be configured for dark field (DF) imaging of specimens. However, the imaging subsystem may also or alternatively include detection channel(s) that are configured for bright field (BF) imaging of specimens. In other words, the imaging subsystem may include at least one detection channel that is configured to detect light specularly reflected from the specimen. Therefore, the imaging subsystems described herein may be configured for only DF, only BF, or both DF and BF imaging. Although each of the collectors are shown in FIG. 1 as single refractive optical elements, it is to be understood that each of the collectors may include one or more refractive optical element(s) and/or one or more reflective optical element(s).

The one or more detection channels may include any suitable detectors known in the art. For example, the detectors may include photo-multiplier tubes (PMTs), charge coupled devices (CCDs), time delay integration (TDI) cameras, and any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the imaging subsystem may be signals or data, but not image signals or image data. In such instances, a computer subsystem such as computer subsystem 36 may be configured to generate images of the specimen from the non-imaging output of the detectors. However, in other instances, the detectors may be configured as imaging detectors that are configured to generate image signals or image data. Therefore, the imaging subsystem may be configured to generate the images described herein in a number of ways.

It is noted that FIG. 1 is provided herein to generally illustrate a configuration of an imaging system or subsystem that may be included in the system embodiments described herein or that may generate images that are used by the system embodiments described herein. Obviously, the imaging subsystem configuration described herein may be altered to optimize the performance of the imaging subsystem as is normally performed when designing a commercial imaging system. In addition, the systems described herein may be implemented using an existing system (e.g., by adding functionality described herein to an existing system) such as the 29xx/39xx and Puma 9xxx series of tools that are commercially available from KLA-Tencor, Milpitas, Calif. For some such systems, the embodiments described herein may be provided as optional functionality of the system (e.g., in addition to other functionality of the system). Alternatively, the imaging subsystem described herein may be designed "from scratch" to provide a completely new imaging subsystem.

Computer subsystem 36 of the imaging subsystem may be coupled to the detectors of the imaging subsystem in any suitable manner (e.g., via one or more transmission media, which may include "wired" and/or "wireless" transmission media) such that the computer subsystem can receive the output generated by the detectors during scanning of the specimen. Computer subsystem 36 may be configured to perform a number of functions described further herein using the output of the detectors.

The computer subsystems shown in FIG. 1 (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems as described further herein. For example, computer subsystem 36 may be coupled to computer subsystem(s) 102 as shown by the dashed line in FIG. 1 by any suitable transmission media, which may include any suitable wired and/or wireless transmission media known in the art. Two or more of such computer subsystems may also be effectively coupled by a shared computer-readable storage medium (not shown).

Figure 1A:
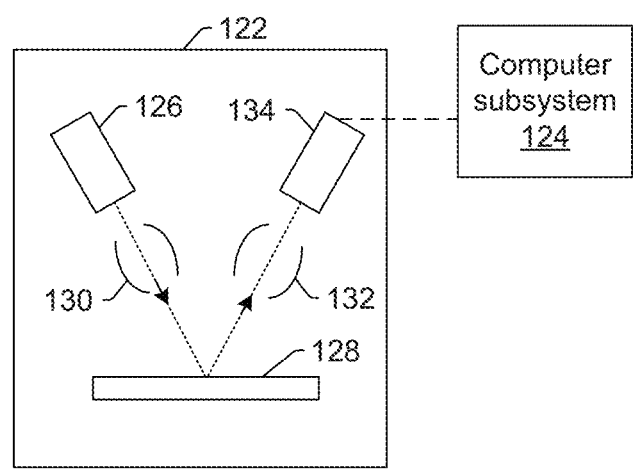

Although the imaging subsystem is described above as being an optical or light-based imaging subsystem, in some embodiments, the imaging subsystem may be configured as an electron beam based imaging subsystem. In this manner, in some embodiments, the images are generated by an electron beam based imaging subsystem. In one such embodiment shown in FIG. 1a, the imaging subsystem includes electron column 122 coupled to computer subsystem 124. As also shown in FIG. 1a, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 1a as being configured such that the electrons are directed to the specimen at an oblique angle of incidence and are scattered from the specimen at another oblique angle, it is to be understood that the electron beam may be directed to and scattered from the specimen at any suitable angles. In addition, the electron beam based imaging subsystem may be configured to use multiple modes to generate images of the specimen as described further herein (e.g., with different illumination angles, collection angles, etc.). The multiple modes of the electron beam based imaging subsystem may be different in any image generation parameters of the imaging subsystem.

Computer subsystem 124 may be coupled to detector 134 as described above. The detector may detect electrons returned from the surface of the specimen thereby forming electron beam images of the specimen. The electron beam images may include any suitable electron beam images. Computer subsystem 124 may be configured to perform one or more functions described further herein for the specimen using output generated by detector 134. Computer subsystem 124 may be configured to perform any additional step(s) described herein. A system that includes the imaging subsystem shown in FIG. 1a may be further configured as described herein.

It is noted that FIG. 1a is provided herein to generally illustrate a configuration of an electron beam based imaging subsystem that may be included in the embodiments described herein. As with the optical based imaging subsystem described above, the electron beam based imaging subsystem configuration described herein may be altered to optimize the performance of the imaging subsystem as is normally performed when designing a commercial imaging system. In addition, the systems described herein may be implemented using an existing system (e.g., by adding functionality described herein to an existing system) such as the eSxxx and eDR-xxxx series of tools that are commercially available from KLA-Tencor. For some such systems, the embodiments described herein may be provided as optional functionality of the system (e.g., in addition to other functionality of the system). Alternatively, the system described herein may be designed "from scratch" to provide a completely new system.

Although the imaging subsystem is described above as being an optical based or electron beam based imaging subsystem, the imaging subsystem may be an ion beam based imaging subsystem. Such an imaging subsystem may be configured as shown in FIG. 1a except that the electron beam source may be replaced with any suitable ion beam source known in the art. In addition, the imaging subsystem may be any other suitable ion beam based imaging subsystem such as those included in commercially available focused ion beam (FIB) systems, helium ion microscopy (HIM) systems, and secondary ion mass spectroscopy (SIMS) systems.

As noted above, the imaging subsystem is configured for scanning energy (e.g., light or electrons) over a physical version of the specimen thereby generating actual images for the physical version of the specimen. In this manner, the imaging subsystem may be configured as an "actual" subsystem, rather than a "virtual" subsystem. For example, a storage medium (not shown) and computer subsystem(s) 102 shown in FIG. 1 may be configured as a "virtual" system. In particular, the storage medium and the computer subsystem(s) are not part of imaging subsystem 10 and do not have any capability for handling the physical version of the specimen. In other words, in systems configured as virtual systems, the output of its one or more "detectors" may be output that was previously generated by one or more detectors of an actual system or subsystem and that is stored in the virtual system, and during the "scanning," the virtual system may replay the stored output as though the specimen is being scanned. In this manner, scanning the specimen with a virtual system may appear to be the same as though a physical specimen is being scanned with an actual system or subsystem, while, in reality, the "scanning" involves simply replaying output for the specimen in the same manner as the specimen may be scanned. Systems and methods configured as "virtual" inspection systems are described in commonly assigned U.S. Pat. No. 8,126,255 issued on Feb. 28, 2012 to Bhaskar et al. and U.S. Pat. No. 9,222,895 issued on Dec. 29, 2015 to Duffy et al., both of which are incorporated by reference as if fully set forth herein. The embodiments described herein may be further configured as described in these patents. For example, the one or more computer subsystems described herein may be further configured as described in these patents. In addition, configuring the one or more virtual systems as a central compute and storage (CCS) system may be performed as described in the above-referenced patent to Duffy. The persistent storage mechanisms described herein can have distributed computing and storage such as the CCS architecture, but the embodiments described herein are not limited to that architecture.

As further noted above, the imaging subsystem may be configured to generate images of the specimen with multiple modes. In general, a "mode" can be defined by the values of parameters of the imaging subsystem used for generating images of a specimen or the output used to generate images of the specimen. Therefore, modes that are different may be different in the values for at least one of the imaging parameters of the imaging subsystem. For example, in one embodiment of an optical based imaging subsystem, at least one of the multiple modes uses at least one wavelength of light for illumination that is different from at least one wavelength of the light for illumination used for at least one other of the multiple modes. The modes may be different in the illumination wavelength as described further herein (e.g., by using different light sources, different spectral filters, etc.) for different modes. In another embodiment, at least one of the multiple modes uses an illumination channel of the imaging subsystem that is different from an illumination channel of the imaging subsystem used for at least one other of the multiple modes. For example, as noted above, the imaging subsystem may include more than one illumination channel. As such, different illumination channels may be used for different modes.

In one embodiment, the images are generated by an inspection subsystem. For example, the optical and electron beam imaging subsystems described herein may be configured as inspection subsystems. In this manner, the image inputs to the neural network are generated by an inspection subsystem in some embodiments. In another embodiment, the imaging subsystem is a defect review subsystem. For example, the optical and electron beam imaging subsystems described herein may be configured as defect review subsystems. In particular, the embodiments of the imaging subsystems described herein and shown in FIGS. 1 and 1*a* may be modified in one or more parameters to provide different imaging capability depending on the application for which they will be used. In one such example, the imaging subsystem shown in FIG. 1 may be configured to have a higher resolution if it is to be used for defect review rather than for inspection. In other words, the embodiments of the imaging subsystem shown in FIGS. 1 and 1*a* describe some general and various configurations for an imaging subsystem that can be tailored in a number of manners that will be obvious to one skilled in the art to produce imaging subsystems having different imaging capabilities that are more or less suitable for different applications.

The one or more computer subsystems may be configured for acquiring the images for the specimen generated by an imaging subsystem described herein. Acquiring the images may be performed using one of the imaging subsystems described herein (e.g., by directing light or an electron beam to the specimen and detecting light or an electron beam, respectively, from the specimen). In this manner, acquiring the images may be performed using the physical specimen itself and some sort of imaging hardware. However, acquiring the images does not necessarily include imaging the specimen using imaging hardware. For example, another system and/or method may generate the images and may store the generated images in one or more storage media such as a virtual inspection system as described herein or another storage media described herein. Therefore, acquiring the images may include acquiring the images from the storage media in which it has been stored.

The component(s), e.g., component(s) 100 shown in FIG. 1, executed by the computer subsystem(s), e.g., computer subsystem 36 and/or computer subsystem(s) 102, include neural network 104. The neural network is configured for detecting defects on a specimen and classifying the defects detected on the specimen. In this manner, the same neural network is configured for defect detection and defect classification. As such, the neural network provides a unified framework for defect detection and classification.

The neural network includes a first portion configured for determining features of images of the specimen generated by an imaging subsystem. For example, as shown in the neural network of FIG. 2, a first portion of the neural network includes, in one embodiment, convolutional layer(s) 206 that determine features (e.g., feature map 208) of image(s) 204, which include, as described further herein, at least defect images and possibly also reference images and design. These layers may be further configured as described herein. The images and the features may also be further configured as described herein.

Figure 2:
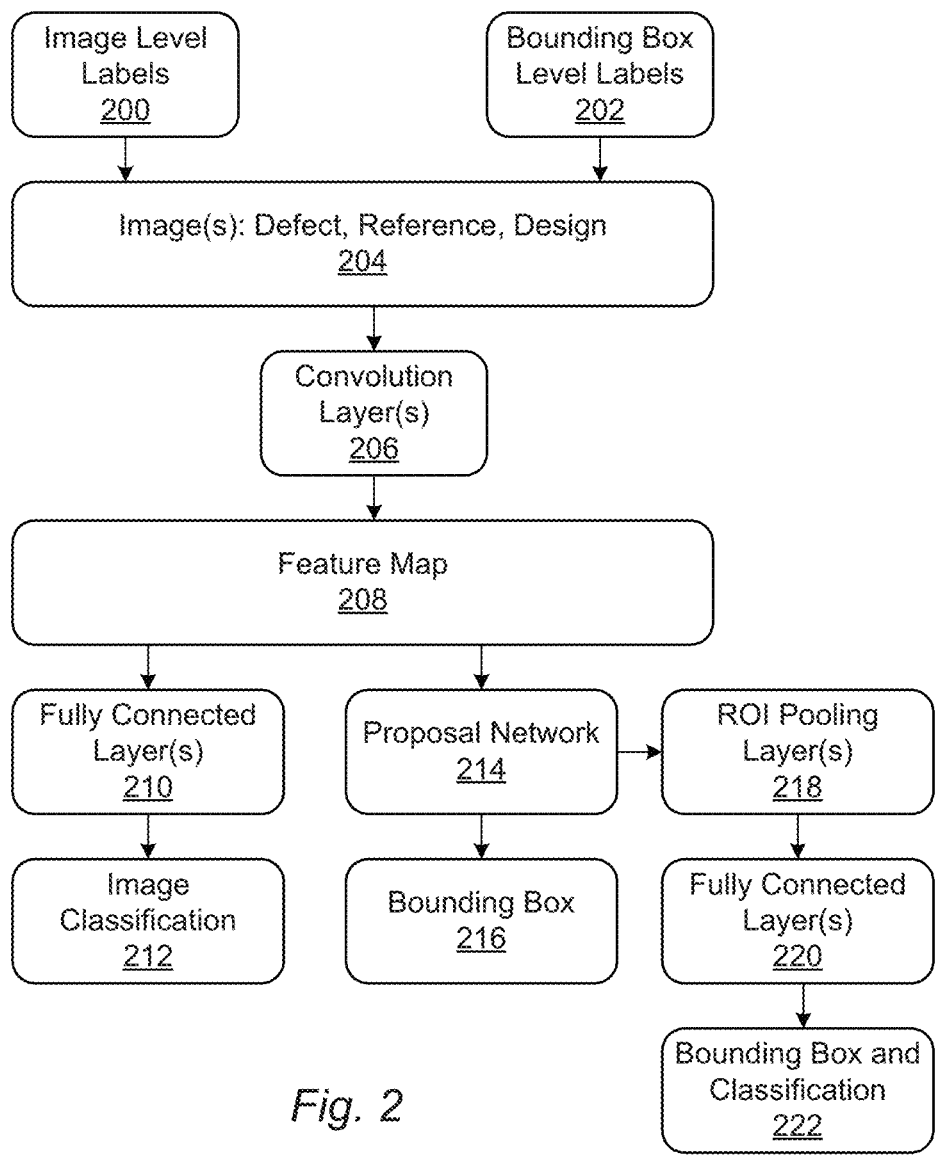
FIG. 2 is a flow chart illustrating one embodiment of a neural network in a training phase.

The neural network also includes a second portion configured for detecting defects on the specimen based on the determined features of the images and classifying the defects detected on the specimen based on the determined features of the images. For example, as shown in the neural network of FIG. 2, a second portion of the neural network includes, in one embodiment, fully connected layer(s) 210, proposal network 214, region of interest (ROI) pooling layer(s) 218, and fully connected layer(s) 220. As further shown in FIG. 2, the input to fully connected layer(s) 210 is the determined features, e.g., feature map 208, and the output of fully connected layer(s) 210 is image classification 212. Therefore, fully connected layer(s) 210 may be included in the second portion and may be configured for defect classification. As also shown in FIG. 2, the input to proposal network 214 is the determined features, e.g., feature map 208, and the output of proposal network 214 is bounding box 216. The term "bounding box" is generally defined herein as a box (square or rectangular) drawn around one or more contiguous portions of pixels identified as defective. For example, a bounding box may include one or two regions of pixels identified as defective. Therefore, proposal network 214 may be included in the second portion and may be configured for defect detection. As further shown in FIG. 2, the input to proposal network 214 is the determined features, e.g., feature map 208, and the output of proposal network 214 may be input to ROI pooling layer(s) 218. The output of ROI pooling layer(s) 218 may be input to fully connected layer(s) 220, which may generate output including bounding box and classification 222. In this manner, proposal network

214, ROI pooling layer(s) 218, and fully connected layer(s) 220 may be included in the second portion and may be configured for both defect detection and classification. These layers may be further configured as described herein. The various one or more outputs may also be further configured as described herein.

The one or more computer subsystems are configured for generating results of the detecting and classifying. The results of the detecting and classifying may include any of the results described herein such as information, e.g., location, etc., of the bounding boxes of the detected defects, detection scores, information about the defect classifications such as class labels or IDs, etc., or any such suitable information known in the art. The results of the detecting and classifying may be generated by the computer subsystem(s) in any suitable manner. The results of the detecting and classifying may have any suitable form or format such as a standard file type. The computer subsystem(s) may generate the results and store the results such that the results can be used by the computer subsystem(s) and/or another system or method to perform one or more functions for the specimen or another specimen of the same type. Such functions include, but are not limited to, altering a process such as a fabrication process or step that was performed on the specimen in a feedback manner, altering a process such as a fabrication process or step that will be performed on the specimen in a feedforward manner, etc.

In one embodiment, the neural network is configured as a deep learning network. Generally speaking, "deep learning" (also known as deep structured learning, hierarchical learning or deep machine learning) is a branch of machine learning based on a set of algorithms that attempt to model high level abstractions in data. In a simple case, there may be two sets of neurons: ones that receive an input signal and ones that send an output signal. When the input layer receives an input, it passes on a modified version of the input to the next layer. In a deep network, there are many layers between the input and output (and the layers are not made of neurons but it can help to think of it that way), allowing the algorithm to use multiple processing layers, composed of multiple linear and non-linear transformations.

Deep learning is part of a broader family of machine learning methods based on learning representations of data. An observation (e.g., an image) can be represented in many ways such as a vector of intensity values per pixel, or in a more abstract way as a set of edges, regions of particular shape, etc. Some representations are better than others at simplifying the learning task (e.g., face recognition or facial expression recognition). One of the promises of deep learning is replacing handcrafted features with efficient algorithms for unsupervised or semi-supervised feature learning and hierarchical feature extraction.

Research in this area attempts to make better representations and create models to learn these representations from large-scale unlabeled data. Some of the representations are inspired by advances in neuroscience and are loosely based on interpretation of information processing and communication patterns in a nervous system, such as neural coding which attempts to define a relationship between various stimuli and associated neuronal responses in the brain.

In another embodiment, the neural network is a machine learning network. Machine learning can be generally defined as a type of artificial intelligence (AI) that provides computers with the ability to learn without being explicitly programmed. Machine learning focuses on the development of computer programs that can teach themselves to grow and change when exposed to new data. In other words, machine learning can be defined as the subfield of computer science that "gives computers the ability to learn without being explicitly programmed." Machine learning explores the study and construction of algorithms that can learn from and make predictions on data—such algorithms overcome following strictly static program instructions by making data driven predictions or decisions, through building a model from sample inputs.

The machine learning described herein may be further performed as described in "Introduction to Statistical Machine Learning," by Sugiyama, Morgan Kaufmann, 2016, 534 pages; "Discriminative, Generative, and Imitative Learning," Jebara, MIT Thesis, 2002, 212 pages; and "Principles of Data Mining (Adaptive Computation and Machine Learning)," Hand et al., MIT Press, 2001, 578 pages; which are incorporated by reference as if fully set forth herein. The embodiments described herein may be further configured as described in these references.

In some embodiments, the neural network is a generative network. A "generative" network can be generally defined as a model that is probabilistic in nature. In other words, a "generative" network is not one that performs forward simulation or rule-based approaches. Instead, as described further herein, the generative network can be learned (in that its parameters can be learned) based on a suitable training set of data. In one embodiment, the neural network is configured as a deep generative network. For example, the network may be configured to have a deep learning architecture in that the network may include multiple layers, which perform a number of algorithms or transformations.

In a further embodiment, the neural network may be a deep neural network with a set of weights that model the world according to the data that it has been fed to train it. Neural networks can be generally defined as a computational approach which is based on a relatively large collection of neural units loosely modeling the way a biological brain solves problems with relatively large clusters of biological neurons connected by axons. Each neural unit is connected with many others, and links can be enforcing or inhibitory in their effect on the activation state of connected neural units. These systems are self-learning and trained rather than explicitly programmed and excel in areas where the solution or feature detection is difficult to express in a traditional computer program.

Neural networks typically consist of multiple layers, and the signal path traverses from front to back. The goal of the neural network is to solve problems in the same way that the human brain would, although several neural networks are much more abstract. Modern neural network projects typically work with a few thousand to a few million neural units and millions of connections. The neural network may have any suitable architecture and/or configuration known in the art.

In one embodiment, the neural network is configured as an AlexNet. For example, the classification network structure can be AlexNet. The term "classification network" is used herein to refer to a CNN, which includes one or more fully connected layers. In general, an AlexNet includes a number of convolutional layers (e.g., 5) followed by a number of fully connected layers (e.g., 3) that are, in combination, configured and trained to classify images. Examples of neural networks configured as AlexNets are described in "ImageNet Classification with Deep Convolutional Neural Networks" by Krizhevsky et al., NIPS 2012, which is incorporated by reference as if fully set forth herein. The neural networks described herein may be further configured as described in this reference.

In another embodiment, the neural network is configured as a GoogleNet. For example, the classification network structure can be GoogleNet. A GoogleNet may include layers such as convolutional, pooling, and fully connected layers such as those described further herein configured and trained to classify images. While the GoogleNet architecture may include a relatively high number of layers (especially compared to some other neural networks described herein), some of the layers may be operating in parallel, and groups of layers that function in parallel with each other are generally referred to as inception modules. Other of the layers may operate sequentially. Therefore, a GoogleNet is different from other neural networks described herein in that not all of the layers are arranged in a sequential structure. Examples of neural networks configured as GoogleNets are described in "Going Deeper with Convolutions," by Szegedy et al., CVPR 2015, which is incorporated by reference as if fully set forth herein. The neural networks described herein may be further configured as described in this reference.

In a further embodiment, the neural network is configured as a VGG network. For example, the classification network structure can be VGG. VGG networks were created by increasing the number of convolutional layers while fixing other parameters of the architecture. Adding convolutional layers to increase depth is made possible by using substantially small convolutional filters in all of the layers. Like the other neural networks described herein, VGG networks were created and trained to classify images. VGG networks also include convolutional layers followed by fully connected layers. Examples of neural networks configured as VGG are described in "Very Deep Convolutional Networks for Large-Scale Image Recognition," by Simonyan et al., ICLR 2015, which is incorporated by reference as if fully set forth herein. The neural networks described herein may be further configured as described in this reference.

In some embodiments, the neural network is configured as a deep residual network. For example, the classification network structure can be a Deep Residual Net. Like some other networks described herein, a deep residual network may include convolutional layers followed by fully connected layers, which are, in combination, configured and trained for image classification. In a deep residual network, the layers are configured to learn residual functions with reference to the layer inputs, instead of learning unreferenced functions. In particular, instead of hoping each few stacked layers directly fit a desired underlying mapping, these layers are explicitly allowed to fit a residual mapping, which is realized by feedforward neural networks with shortcut connections. Shortcut connections are connections that skip one or more layers. A deep residual net may be created by taking a plain neural network structure that includes convolutional layers and inserting shortcut connections which thereby takes the plain neural network and turns it into its residual learning counterpart. Examples of deep residual nets are described in "Deep Residual Learning for Image Recognition" by He et al., NIPS 2015, which is incorporated by reference as if fully set forth herein. The neural networks described herein may be further configured as described in this reference.

In one embodiment, the first portion includes one or more convolutional layers. The convolutional layer(s) may have any suitable configuration known in the art and are generally configured to determine features for an image as a function of position across the image (i.e., a feature map) by applying a convolution function to the input image using one or more filters. In this manner, a part of the neural network may be configured as a convolution neural network (CNN). For example, the first portion of the neural network may be configured as a CNN, which is usually stacks of convolution and pooling layers, to extract local features. The embodiments described herein can take advantage of deep learning concepts such as a CNN to solve the normally intractable representation inversion problem. The first portion may have any CNN configuration or architecture known in the art. The one or more pooling layers may also have any suitable configuration known in the art (e.g., max pooling layers) and are generally configured for reducing the dimensionality of the feature map generated by the one or more convolutional layers while retaining the most important features.

The features determined by the first portion of the neural network may include any suitable features described further herein or known in the art that can be inferred from the input and used to generate the output described further herein. For example, the features may include a vector of intensity values per pixel. The features may also include any other types of features described herein, e.g., vectors of scalar values, vectors of independent distributions, joint distributions, or any other suitable feature types known in the art.

FIG. 2 shows the classification network architecture with all of the possible inputs and outputs. However, the inputs and outputs that are used with the architecture may vary depending on the status of the architecture, e.g., not trained or trained, and/or the function that it will be performing for any given image, e.g., depending on the output or results that a user would like to have generated for a particular image. For example, in the embodiment shown in FIG. 3, the neural network is shown as being used in a fully trained mode (i.e., the neural network has already been trained) with the inputs that may be provided to the neural network for runtime or production mode. (In all of the drawings shown herein, the elements that are shaded (e.g., inputs, outputs, layers) are those that are not being used for a particular application. In contrast, the elements that are not shaded (e.g., inputs, outputs, layers) are those that are being used for a particular application of the neural network.)

Figure 3:
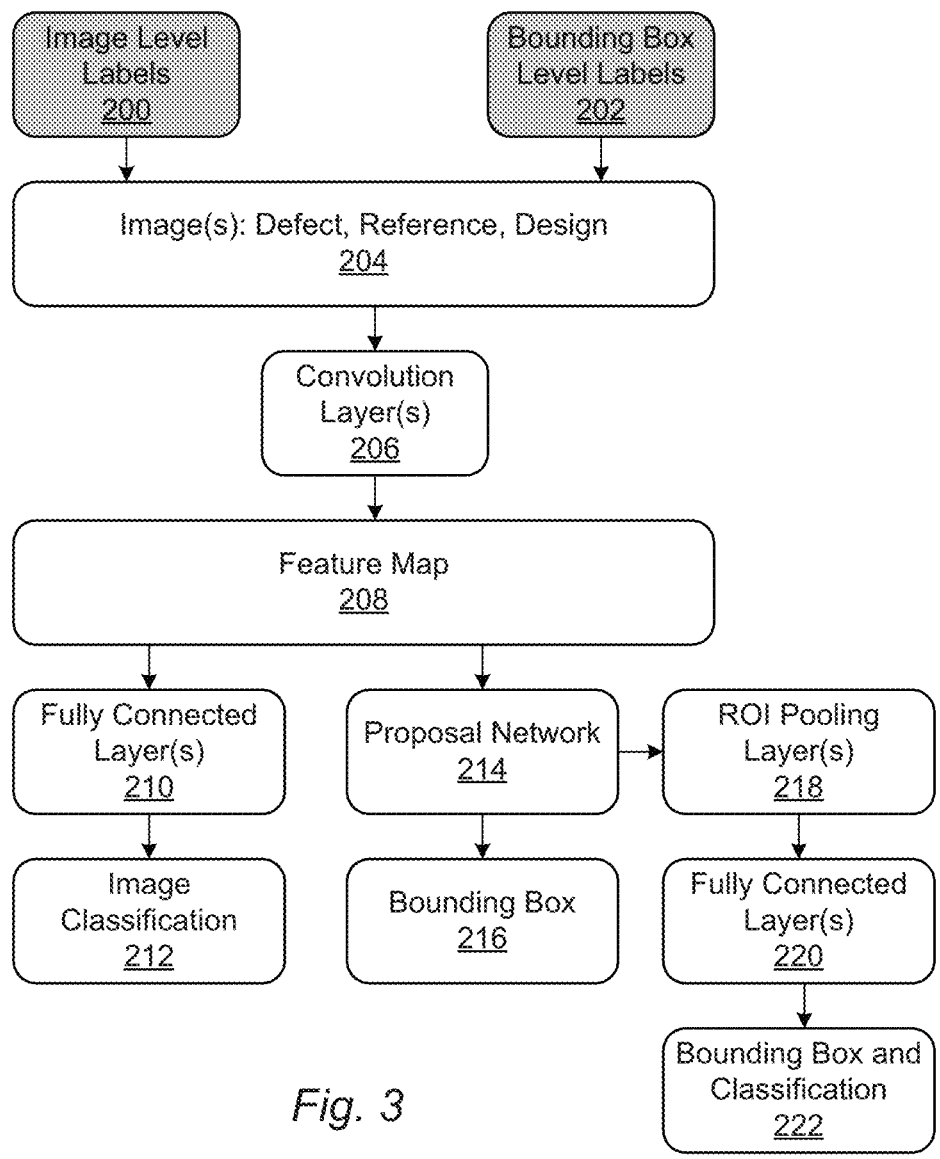
FIG. 3 is a flow chart illustrating one embodiment of the neural network of FIG. 2 in a testing phase.

In particular, as shown in FIG. 3, in a production or runtime mode after the neural network has been trained, of the possible inputs to the neural network, only image(s) 204, which include defect image(s) and possibly also reference image(s) and design, are input to the neural network. In this manner, during runtime, image level labels 200 and bounding box level labels 202 are not input to the neural network. Instead, image level labels 200 and/or bounding box level labels 202 may only be input to the neural network during a training phase, which may be performed as described further herein.

As described further above, during runtime, the image(s) may be input to convolutional layer(s) 206, which produce(s) feature map 208 for the image(s). The feature map may be input to fully connected layer(s) 210, which produce(s) image classification 212 for the image(s). The feature map may also or alternatively be input to proposal network 214, which may produce bounding box 216 for the image(s). In addition, or alternatively, the output of the proposal network may be input to ROI pooling layer(s) 218, which may generate output that is provided to fully connected layer(s) 220. Fully connected layer(s) 220 may produce bounding box and classification 222 for the input image(s). Therefore, as clearly shown in FIG. 3, the neural networks described herein provide a unified framework for both defect classification and detection, and the functions that are performed by the neural network may depend on the application for which it is being used.

Figure 4:
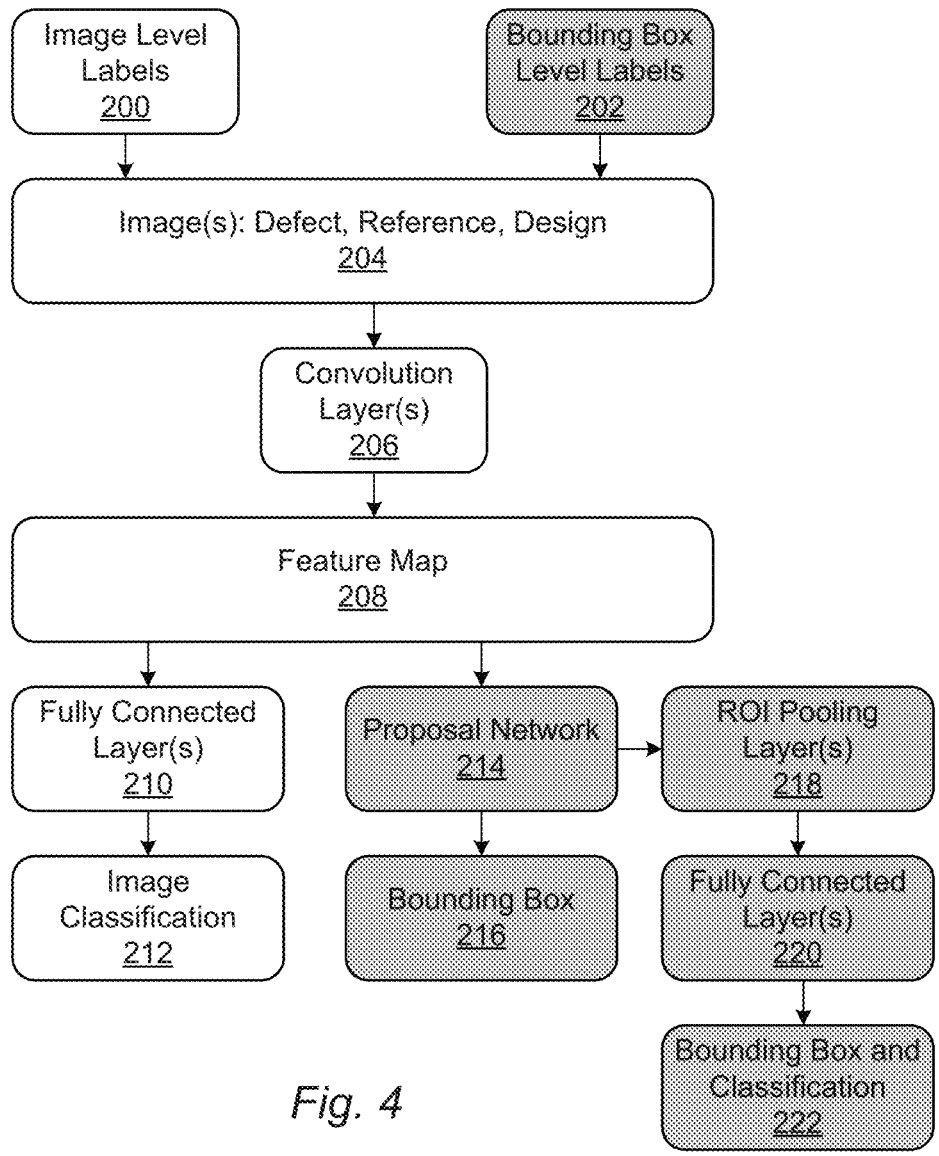
FIG. 4 is a flow chart illustrating one embodiment of the neural network of FIG. 2 in a defect classification use case.

In one embodiment, the one or more computer subsystems are configured to train the neural network by inputting class labels assigned by a user to training defect images and the training defect images to the neural network. For example, during training, a user may assign class per image label. As shown in FIG. 4, image level labels 200 and defect images, e.g., image(s) 204, are used as the input to train the classification CNN. In this case, the image(s) are training defect images rather than the images in which defects are being detected and/or classified as would be the case after the neural network has been trained. The image level labels may be assigned to each training defect image and may include labels such as defect ID 1, defect ID 2, ... defect ID n, pattern defect, bridging defect, etc. Therefore, different image level labels may be associated with each training defect image and/or each defect in each training defect image.

Although the image level labels for the training defect images may be assigned by a user, the image level labels may be assigned to the training defect images by another (already trained) defect classification method or system. The user or the other defect classification method or system may associate or assign image level labels to the training defect images in any suitable manner. In addition, the image level labels and the training defect images may be acquired in any suitable manner. For example, a user may use the embodiments described herein to assign image level labels to a training set of defect images. Alternatively, the image level labels and the training defect images may be acquired by the one or more computer subsystems from a storage medium in which the labels and the training images are stored.

The training set of defect images may be acquired in any suitable manner (e.g., from one of the imaging subsystems described herein, from a computer system of an imaging system, from a storage medium in which the images were stored, etc.). In this manner, the embodiments described herein may or may not generate the training set of defect images using one or more physical specimens. In addition, the training set of defect images may include one or more synthetic images, which may be generally defined as images for which a hypothetical defect has been inserted into the design for the specimen and then a simulated image has been generated for the design including the hypothetical defect and/or an image of a physical specimen that has been altered to insert a defect into the image. In this manner, the training set of defect images may include images generated by imaging actual, physical specimen(s) and/or simulated images. The training set of defect images may also preferably include one or more of the training defect images described above possibly in combination with one or more non-defect images. For example, the training set of defect images may include images of the specimen in which no defect is or was detected. Using a training set of defect images that includes defect images and non-defect images may produce a neural network that is better capable of differentiating between defect images and non-defect images when the neural network is used for defect detection.

In one such embodiment, the one or more computer subsystems are configured to train the neural network by inputting the class labels and the training defect images to the neural network with one or more training reference images, a design for a specimen for which the training defect images were generated, or the one or more training reference images and the design. For example, reference images and/or design can be inserted as the second (and possibly third) channel of the image, e.g., image(s): defect, reference, design 204, as shown in FIG. 4. In this manner, one or more of the reference images and the design can be inserted with the defect images in a second (and possibly) third channel. However, reference images and design are not required for the embodiments described herein. The reference images may include defect free images of the specimen. In this manner, the defect free images described above may be not included in the training set of defect images and may be input to the neural network during training separate from the training defect images. The reference images may include any of the defect free images described above and may be acquired in any suitable manner (e.g., by imaging a specimen and identifying images of the specimen that are defect free as reference images, by acquiring one or more images of specimens known to be defect free, by simulating the reference images from a design for a specimen, etc.). The design may include any of the design or design data described herein, which may be acquired in any suitable manner. The computer subsystem(s) may be configured to train the neural network using the information and images described above in any suitable manner (e.g., by inputting the images and information to the neural network and adjusting one or more parameters of the neural network until image classifications 212 generated by the neural network for the training defect images match image level labels 200 input to the neural network).

In some embodiments, the one or more computer subsystems are configured for fine tuning the neural network using pre-trained weights. Pre-trained weights can be generally defined as weights from a previously trained neural network that is at least similar to or part of the neural network that is being trained or tuned. The pre-trained weights may be obtained by training a neural network or a part of a neural network from scratch or in any other suitable manner using training data such as that described herein. The pre-trained weights can be used to fine tune the neural network described herein. The fine tuning may include fine tuning any one or more parameters of the neural network. Such fine tuning may be performed after training of the neural network performed as described further herein. Alternatively, the pre-trained weights can be used as initial parameters of the neural network, and then the initial parameters of the neural network can be fine-tuned, which may be performed as described herein with respect to training.

In one such embodiment, the pre-trained weights are obtained by training an image classification network (e.g., on a relatively large dataset (such as ImageNet, a natural image dataset or not necessarily a dataset obtained from an imaging tool such as that described herein)). In some instances, the image classification network may be configured to perform classification of defects detected on specimens such as the specimens described herein. However, the image classification network may include any other known image classification network such as those configured to classify natural images. In this manner, the pre-trained weights may be obtained by training a network that has at least some similar capability to those described herein. However, the image classification network may have any suitable neural network configuration, including but not limited to those described herein, that can perform defect (or image) classification. In another such embodiment, the pre-trained weights are obtained by training the second portion configured for classifying the defects detected on the specimen. For example, the second portion of the neural network that is described herein as being configured for classifying defects detected on the specimen can be trained to generate the pre-trained weights, which can then be used to fine tune the overall neural network.

Any of the pre-trained weights described herein can be used to fine tune a defect image classification portion of the network (e.g., the portion of the network that includes layers 206 and 210). During fine tuning, the pre-trained weights may be used to initialize layer(s) 206 and therefore feature map 208. The pre-trained weights described herein can also be used to fine tune a defect detection portion of the network (e.g., the portion of the network that includes layers 206 and 214). During fine tuning, the pre-trained weights can be used to initialize layer(s) 206 and therefore feature map 208. In addition, the pre-trained weights described herein and/or the trained values of the parameters of the neural network generated by fine tuning the defect detection portion of the network can be used to fine tune a defect detection and classification portion of the network (e.g., the portion of the network that includes layers 206, 214, 218, and 220). During this fine tuning process, the pre-trained weights can be used to initialize layer(s) 206 and therefore feature map 208 and to initialize layer 214.

In another embodiment, the one or more computer subsystems are configured for training the neural network from scratch. For example, the neural networks described herein can be trained without using pre-trained weights and from scratch using any of the training data and images described herein.

In one embodiment, the second portion includes one or more fully connected layers configured for selecting one or more of the determined features and classifying the defects based on the one or more selected features. A "fully connected layer" may be generally defined as a layer in which each of the nodes is connected to each of the nodes in the previous layer. The fully connected layer(s) perform classification based on the features extracted by the convolutional layer(s). One such embodiment is shown in FIG. 4. In particular, as shown in FIG. 4, the classification network includes two parts: convolution layer(s) 206, which are included in the first portion described herein, and fully connected layer(s) 210, which are included in the second portion described herein. The convolution layer(s) are configured to generate feature map 208 thereby determining features for image(s) 204, which may include any of the image(s) and inputs described further herein. The fully connected layer(s) are configured for feature selection and classification. In other words, the fully connected layer(s) select features from feature map 208 and then classify the defects in the image(s) based on the selected features. The selected features may include all of the features in the feature map (if appropriate) or only some of the features in the feature map. The classification network (including the convolution layers(s) and the fully connected layer(s)) outputs image classification 212, which may include a classification result per image with a confidence associated with each classification result. The results of the image classification can also be used as described further herein. The image classification may have any suitable format (such as an image or defect ID, a defect description such as "pattern," "bridge," etc.). The image classification results may be stored and used as described further herein.

FIG. 4 shows the neural network in a training use case in which image level labels 200 are shown as being input to the neural network. When this neural network is being used for production or runtime (after the neural network is trained), then image level labels 200 would not be input to the neural network. Instead, the only input would be image(s) 204.

In some embodiments, the one or more computer subsystems are configured for fine tuning the neural network using pre-trained weights. Such fine tuning may be performed as described further herein. In another embodiment, the one or more computer subsystems are configured for training the neural network from scratch. Such training may be performed as described herein. In this manner, the network shown in FIG. 4 can be fine-tuned from pre-trained weights. The pre-trained weights can be obtained by training using image level labeled natural images or scanning electron microscope (SEM) images. The natural images may include any suitable natural training images known in the art. The SEM images may include any suitable SEM images that are available and are of specimens similar to the specimen(s) for which the neural network will be used. If image(s) 204 will include optical images, then the training images may include optical images instead of SEM images.

Figure 5:
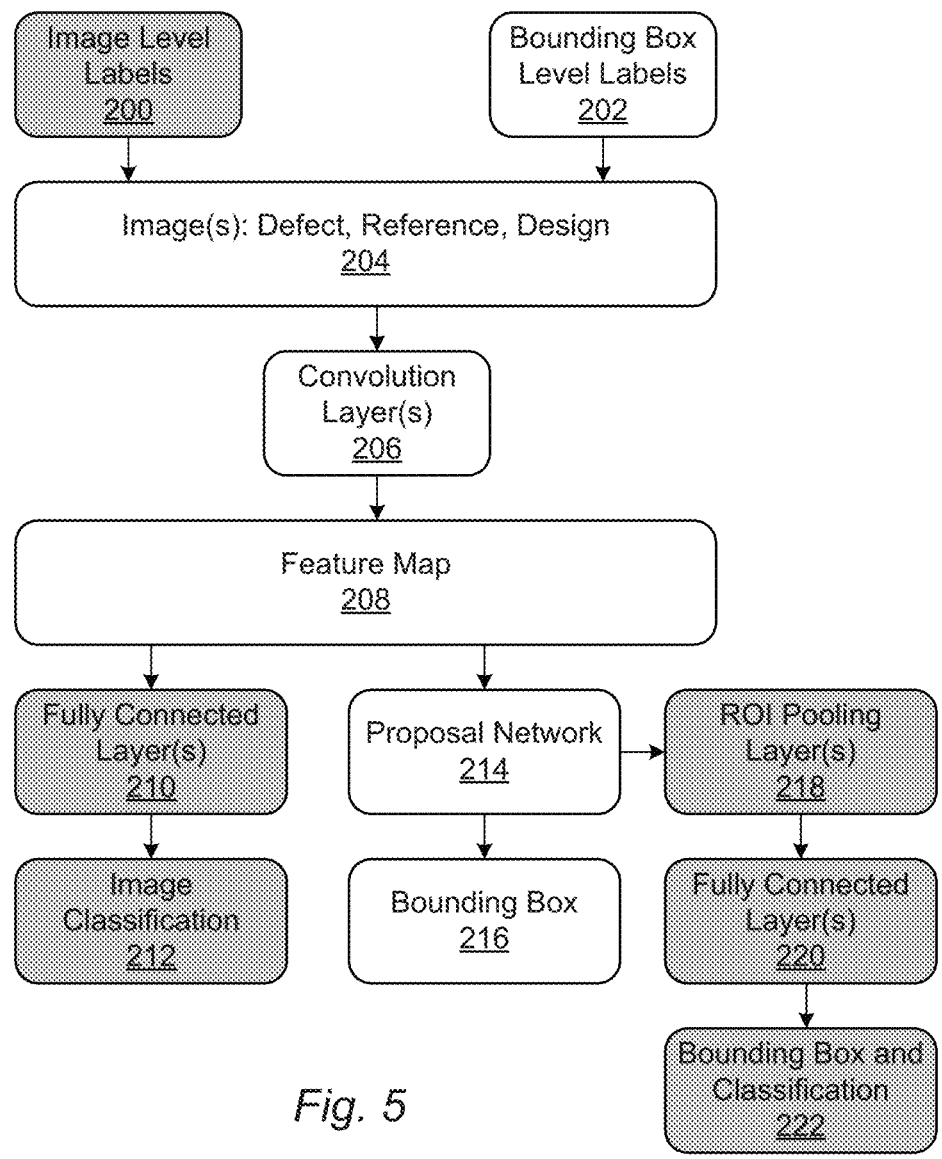
FIG. 5 is a flow chart illustrating one embodiment of the neural network of FIG. 2 in a defect detection use case.

Like the neural network described above, another embodiment configured for defect detection also includes the convolution layer(s) described above. In this manner, this embodiment may be configured as a detection CNN. One embodiment of such a neural network is shown in FIG. 5. In the embodiment shown in FIG. 5, the second portion includes a proposal network configured for detecting defects on the specimen based on the features determined for the images and generating bounding boxes for each of the detected defects. In this manner, the detection network shown in FIG. 5 includes two parts: convolution layer(s) 206, which are included in the first portion described herein, and proposal network 214, which is included in the second portion described herein. The convolution layer(s) are configured to determine features and generate feature map 208 for image(s) 204, which may include any of the image(s) and inputs described herein. The proposal network is configured for defect detection. In other words, the proposal network uses feature(s) from feature map 208 to detect the defects in the image(s) based on the determined features. The proposal network is configured to generate bounding box detection results (e.g., bounding box 216). In this manner, the detection CNN (including the convolution layers(s) and the proposal network) outputs bounding box 216, which may include a bounding box associated with each detected defect or more than one detected defect. The network may output bounding box locations with detection scores on each bounding box. The detection score for a bounding box may be a number (such as 0.5). The results of the defect detection can also be stored and used as described further herein.

A proposal network or a "region proposal network" can be generally defined as a fully convolutional network that detects objects in images and proposes regions corresponding to those detected objects. Examples of proposal networks are described in "Faster R-CNN: Towards Real-Time Object Detection with Region Proposal Networks" by Ren et al., NIPS, 2015, which is incorporated by reference as if fully set forth herein. The proposal network described herein may be further configured as described in this reference. Proposal networks are attractive for use in the embodiments described herein because they are relatively fast and are able to detect objects of different size. The proposal network may overlay a sliding window on the feature map generated by the convolution layer(s) thereby generating k anchor boxes. The results of overlaying the sliding window on the feature map may be input to an intermediate layer of the proposal network, which may generate 2 k scores via a cls layer and 4 k coordinates via a reg layer.

FIG. 5 shows the neural network in a training use case in which bounding box level labels 202 are shown as being input to the neural network. When this neural network is being used for production or runtime (after the neural network is trained), then bounding box level labels 202 would not be input to the neural network. Instead, the only input may be image(s) 204, which can as described further herein include defect images, reference images, and design.

In some embodiments, the one or more computer subsystems are configured to train the neural network by inputting class labels assigned by a user to bounding boxes in training defect images and the training defect images to the neural network. For example, a user may assign class per bounding box. Bounding box level labels and the defect images may then be used as input to train the neural network. The training may be performed as described further herein. The class labels may include any of the class labels described herein. The training defect images may include any of the training defect images described herein. In addition, the class labels and the training defect images may be acquired as described further herein.

In one such embodiment, the one or more computer subsystems are configured to train the neural network by inputting the class labels and the training defect images to the neural network with one or more training reference images, a design for a specimen for which the training defect images were generated, or the one or more training reference images and the design. For example, reference images and/or design can be inserted as the second (and possibly third) channel of the input, but the reference images and/or design are not required. Such training may be performed as described further herein. The class labels, the training defect images, the training reference image(s) and the design may include any of such information and images described herein acquired in any suitable manner described herein.

In some embodiments, the one or more computer subsystems are configured for fine tuning the neural network using pre-trained weights. Such fine tuning may be performed as described further herein. In one such embodiment, the pre-trained weights are obtained by training a defect classification network. Such pre-trained weights may be obtained as described further herein. In another embodiment, the one or more computer subsystems are configured for training the neural network from scratch. For example, for the embodiment shown in FIG. 5, the network can be fine-tuned from the pre-trained weights or trained from scratch. Such training can be performed as described further herein. Due to sharing of the convolution layer(s) (between defect classification and defect detection), classification pre-trained weights can be used. In one such example, the computer subsystem(s) may use pre-trained weights obtained using image level labeling.

Figure 6:
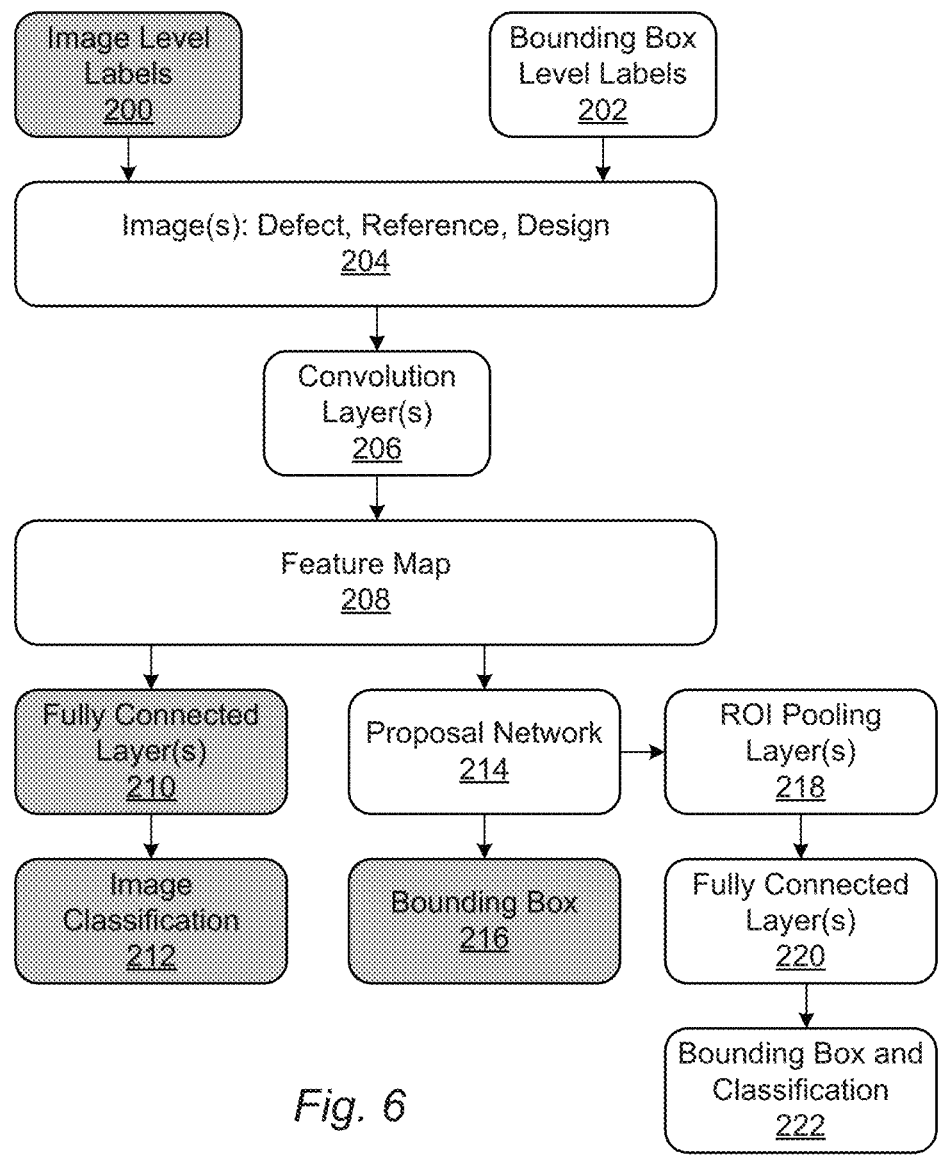
FIG. 6 is a flow chart illustrating one embodiment of the neural network of FIG. 2 in a defect detection and classification use case.

Another embodiment shown in FIG. 6 is configured for both detection and classification. Like the embodiments described further herein, this embodiment includes convolution layer(s) 206, which may be configured as described further herein. Therefore, this neural network may be configured as a detection and classification CNN. In the embodiment shown in FIG. 6, the second portion includes a proposal network, which is configured for detecting defects on the specimen based on the features determined for the images and generating bounding boxes for each of the detected defects, and region of interest (ROI) pooling layer(s) and fully connected layer(s) configured for classifying the detected defects based on the features determined for the defects. In this manner, the detection and classification network includes three parts, convolution layer(s) 206, which are included in the first portion described herein, proposal network 214, which is included in the second portion described herein, and ROI pooling layer(s) 218 plus fully connected layer(s) 220, which are also included in the second portion described herein. The convolution layer(s) are configured to determine features and generate feature map 208 for image(s) 204, which may include any of the image(s) and inputs described herein. The proposal network is configured for defect detection as described above, and the results generated by the proposal network may include any of the defect detection results described herein.

In one such embodiment, the second portion includes one or more ROI pooling layers followed by one or more fully connected layers, the one or more ROI pooling layers are configured for generating fixed length representations of the generated bounding boxes, the fixed length representations are input to the one or more fully connected layers, and the one or more fully connected layers are configured for selecting one or more of the determined features and classifying the detected defects based on the one or more selected features. In this manner, the proposal network is used to generate bounding box detection. The bounding boxes are sent to ROI pooling layer(s) 218, which construct fixed length fully connected layer inputs. For example, the proposal network may advantageously generate bounding boxes having different dimensions or sizes (which depend on the size of the defects detected in the images). The ROI pooling layer(s) are able to accept input images of different sizes. Therefore, the ROI pooling layer(s) can accept the bounding box images generated by the proposal network and can adjust the sizes of the bounding box images to create fixed length inputs for fully connected layer(s) 220. For example, a convolution layer can accept input of different sizes while a fully connected layer cannot. Therefore, a convolution layer may generate feature maps that have arbitrary size and the proposal network may generate bounding boxes having arbitrary size. The ROI pooling layer(s) may then adjust the size of any of the feature maps and/or bounding boxes to a fixed length required by the fully connected layer(s) thereby producing fixed length representations that can be input to the fully connected layer(s). Fully connected layer(s) 220 may be further configured as described herein. The network outputs bounding box locations with classification labels and confidence on each bounding box. For example, as shown in FIG. 6, the output may include bounding box and classification 222 results. Examples of pooling layers are described in "Spatial Pyramid Pooling in Deep Convolutional Networks for Visual Recognition," by He et al., TPAMI, 2015, which is incorporated by reference as if fully set forth herein. The ROI pooling layer(s) described herein may be further configured as described in this reference. Bounding box and classification 222 results may include any of the results described herein and may be stored and used as described further herein.

As shown in FIG. 6, bounding box level labels 202 and defect images 204 may be used as the input to train the detection and classification CNN. Reference images and/or design can be inserted as the second (and possibly third) channel of the input, but the reference images and/or design are not required. When this neural network is being used for production or runtime (after the neural network is trained), then bounding box level labels 202 would not be input to the neural network. Instead, the only input would be image(s) 204.

In some embodiments, the one or more computer subsystems are configured for fine tuning the neural network using pre-trained weights. Such fine tuning may be performed as described further herein. In some such embodiments, the one or more computer subsystems are configured for fine tuning the one or more ROI pooling layers and the one or more fully connected layers using the proposal network. Such fine tuning may be performed in any suitable manner. In one such embodiment, the pre-trained weights are obtained by training an image classification network. Such an image classification network may be further configured as described herein. In another such embodiment, the pre-trained weights are obtained by training the second portion of the neural network configured for classifying the defects detected on the specimen. Such training may be performed as described herein. In another embodiment, the one or more computer subsystems are configured for training the neural network from scratch. Such training may be performed as described further herein. In this manner, the network can be fine-tuned from pre-trained weights obtained by training another neural network or the detection portion of the neural network (the portion of the neural network including the proposal network), or the network can be trained from scratch. The pre-trained weights can be obtained using the classification network, which may be performed as described further herein. Because of sharing of the convolution layer(s), the classification pre-trained weights can be used.

In summary, therefore, the embodiments described herein provide a unified deep learning framework for defect classification and inspection (detection). The classification network portion of the unified deep learning framework can be trained using class per image label and defect images and will output class per image with classification confidence. The detection network portion of the unified deep learning framework can be trained using class per bounding box and defect images and will output bounding box location and detection score per bounding box. The detection and classification network portion of the unified deep learning framework can be trained using class per bounding box and defect images and will output bounding box location and class per bounding box with classification confidence.

The above three portions of the unified deep learning framework advantageously share the same convolution layer(s) and can be fine tuned (trained) using the same pre-trained weights. Therefore, the embodiments described herein are generalizable and provide a unified approach due to the common convolution layer(s). All configurations of the framework require only defect images for training. Reference images and/or design images are not required. However, reference images and/or design images can be inserted as the second channel (and possibly third channel) of the input if needed. In addition, the embodiments described herein make possible using pre-trained weights that are obtained using existing image level labeled data without any further annotation requirement.

The embodiments described herein have a number of advantages over currently used methods for defect detection and classification. For example, since the embodiments described herein use a single set of convolution layer(s) for defect detection and classification, pre-trained weights can be obtained using the image level labeled data (e.g., natural images and/or SEM or optical images). In addition, since the embodiments described herein include only one set of convolution layer(s) for both defect detection and classification, the embodiments enable easy plug ins of state of the art networks such as AlexNet, Deep Residual Nets, VGG, and GoogleNets. Furthermore, since the embodiments described herein include only one set of convolution layer(s), each network can be fine-tuned from pre-trained weights or trained from scratch.

The unified deep learning classification and detection framework embodiments described herein have therefore multiple advantages over previously used approaches. For example, the embodiments described herein have a number of ease of use and cost advantages. In one such example, the embodiments described herein significantly reduce the burden on the user to annotate defects at the pixel level for the detection network to learn. In other words, the embodiments described herein enable bounding box labeling for detection, which significantly reduces user annotation burden. In this manner, the embodiments provide ease of use for annotation, training, and testing. In another such example, pre-trained weights can be created directly using existing image level labeled data. In this manner, the embodiments described herein can make immediate use of prior knowledge by directly using image level labeled data to generate pre-trained weights. The embodiments described herein also enable easy building of a dataset for generating pre-trained weights. In an additional example, fine tuning the embodiments described herein from pre-trained weights reduces the training time by about 90% and training defects requirements for both networks. In this manner, the embodiments described herein may share the same pre-trained weights thereby reducing training time and training defect requirements for both detection and classification, which can reduce the time to recipe (i.e., the time involved in setting up a recipe).

In another example, the embodiments described herein have a number of advantages due to knowledge sharing. In one such example, the embodiments described herein may make use of prior knowledge. In particular, pre-trained weights can be obtained immediately using image level labeled data. In this manner, the embodiments described herein can make use of previous data to obtain pre-trained weights. In another such example, the embodiments described herein can meet user requirements better and faster. In particular, by using pre-trained weights for fine tuning, the classification task can meet user performance requirements with limited training defects. The detection task can provide novelty detection with limited training data. In an additional such example, the embodiments described herein can carry information across detection and classification networks for maximal performance.

In an additional example, the framework of the embodiments described herein treat detection and classification as one problem thereby reducing the training cost. In a further example, the embodiments described herein advantageously include a generalizable framework that allows for scalability to newer technologies as the global roadmap for deep learning evolves. In particular, the embodiments enable easy plug and play of new technologies. The embodiments described herein are also generalizable in that they can apply what is learned from classification to detection and vice versa. In yet another example, the embodiments described herein have cost advantages in that the image computer cost can be reduced due to the sharing of the expensive training process.

Furthermore, the embodiments described herein provide better performance than currently used approaches. For example, the embodiments described herein provide a unified deep learning framework that finally meets user requirements of 90% accuracy/purity on classification and 4 nm sensitivity on detection, where previous methods do not meet such user requirements. In addition, the embodiments described herein carry information across detection and classification networks for maximal performance. Moreover, the embodiments described herein have throughput advantages compared to currently used approaches. For example, the embodiments described herein may have 2× faster throughput on review and inspection tools since only a defect image is required for both classification and detection.

The computer subsystem(s) described herein may be further configured for single image detection as described in U.S. Patent Application Publication No. 2017/0140524 published May 18, 2017 by Karsenti et al., which is incorporated by reference as if fully set forth herein. The embodiments described herein may be further configured for performing transformations (from an input image to a simulated image) such as those described in commonly owned U.S. Patent Application Publication Nos. 2017/0140524 published May 18, 2017 by Karsenti et al., 2017/0148226 published May 25, 2017 by Zhang et al., 2017/0193400 published Jul. 6, 2017 by Bhaskar et al., 2017/0193680 published Jul. 6, 2017 by Zhang et al., 2017/0194126 published Jul. 6, 2017 by Bhaskar et al., 2017/0200260 published Jul. 13, 2017 by Bhaskar et al., 2017/0200264 published Jul. 13, 2017 by Park et al., and 2017/0200265 published Jul. 13, 2017 by Bhaskar et al., and U.S. patent application Ser. No. 15/603,249 filed May 23, 2017 by Zhang et al., which are incorporated by reference as if fully set forth herein. The embodiments described herein may be further configured as described in these patent application publications and applications. In addition, the embodiments described herein may be configured to perform any steps described in these patent application publications and applications.

Another embodiment of a system is configured to detect and classify defects on a specimen. The system includes an imaging subsystem configured for generating images of a specimen. The imaging subsystem may have any configuration described herein. The system also includes one or more computer subsystems, e.g., computer subsystem(s) 102 shown in FIG. 1, configured for acquiring the images. The computer subsystem(s) may be configured as described further herein. The system also includes one or more components, e.g., component(s) 100, executed by the one or more computer subsystems, which may include any of the component(s) described herein. The component(s) include neural network 104, which may be configured as described herein. For example, the neural network is configured for detecting defects on the specimen and classifying the defects detected on the specimen. The neural network includes a first portion configured for determining features of the images of the specimen generated by the imaging subsystem. The neural network also includes a second portion configured for detecting defects on the specimen based on the determined features of the images and classifying the defects detected on the specimen based on the determined features of the images. The one or more computer subsystems are configured for generating results of the detecting and classifying. This system embodiment may be further configured as described herein.

Each of the embodiments of each of the systems described above may be combined together into one single embodiment.

Another embodiment relates to a computer-implemented method for detecting and classifying defects on a specimen. The method includes acquiring images of a specimen generated by an imaging subsystem. The method also includes determining features of the images of the specimen by inputting the images into a first portion of a neural network configured for detecting defects on the specimen and classifying the defects detected on the specimen. One or more components are executed by one or more computer systems, and the one or more computer systems include the neural network. In addition, the method includes detecting defects on the specimen based on the determined features of the images and classifying the defects detected on the specimen based on the determined features of the images by inputting the determined features of the images into a second portion of the neural network. The method further includes generating results of the detecting and classifying.

Each of the steps of the method may be performed as described further herein. The method may also include any other step(s) that can be performed by the system, computer subsystem(s), and/or imaging systems or subsystems described herein. The one or more computer systems, the one or more components, and the neural network may be configured according to any of the embodiments described herein, e.g., computer subsystem(s) 102, component(s) 100, and neural network 104. In addition, the method described above may be performed by any of the system embodiments described herein.

Figure 7:
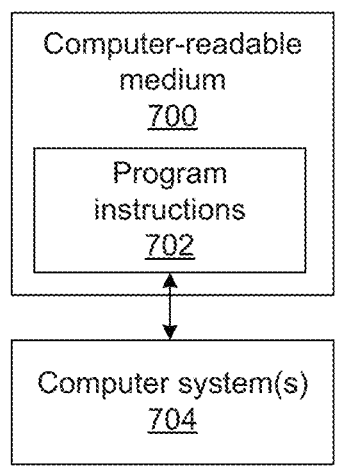
FIG. 7 is a block diagram illustrating one embodiment of a non-transitory computer-readable medium storing program instructions for causing one or more computer systems to perform a computer-implemented method described herein.

An additional embodiment relates to a non-transitory computer-readable medium storing program instructions executable on one or more computer systems for performing a computer-implemented method for detecting and classifying defects on a specimen. One such embodiment is shown in FIG. 7. In particular, as shown in FIG. 7, non-transitory computer-readable medium 700 includes program instructions 702 executable on computer system(s) 704. The computer-implemented method may include any step(s) of any method(s) described herein.

Program instructions 702 implementing methods such as those described herein may be stored on computer-readable medium 700. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system(s) 704 may be configured according to any of the embodiments described herein.

Further modifications and alternative embodiments of various aspects of the invention will be apparent to those skilled in the art in view of this description. For example, methods and systems for detecting and classifying defects on a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to detect and classify defects on a specimen, comprising:
   one or more computer subsystems; and
   one or more components executed by the one or more computer subsystems, wherein the one or more components comprise:
   a neural network configured for detecting defects on a specimen and classifying the defects detected on the specimen, wherein the neural network comprises:

a first portion configured for determining features of images of the specimen generated by an imaging subsystem; and a second portion configured for detecting defects on the specimen based on the determined features of the images and classifying the defects detected on the specimen based on the determined features of the images, wherein the second portion comprises a proposal network configured for detecting defects on the specimen based on the features determined for the images, and wherein the proposal network detects the defects without classifying the defects; and wherein the one or more computer subsystems are configured for generating results of the detecting and classifying.

2. The system of claim 1, wherein the neural network is further configured as a deep learning network.

3. The system of claim 1, wherein the neural network is further configured as an AlexNet.

4. The system of claim 1, wherein the neural network is further configured as a GoogleNet.

5. The system of claim 1, wherein the neural network is further configured as a VGG network.

6. The system of claim 1, wherein the neural network is further configured as a deep residual network.

7. The system of claim 1, wherein the first portion comprises one or more convolutional layers.

8. The system of claim 1, wherein the one or more computer subsystems are further configured to train the neural network by inputting class labels assigned by a user to training defect images and the training defect images to the neural network.

9. The system of claim 8, wherein the one or more computer subsystems are further configured to train the neural network by inputting the class labels and the training defect images to the neural network with one or more training reference images, a design for a specimen for which the training defect images were generated, or the one or more training reference images and the design.

10. The system of claim 1, wherein the one or more computer subsystems are further configured for fine tuning the neural network using pre-trained weights.

11. The system of claim 10, wherein the pre-trained weights are obtained by training an image classification network.

12. The system of claim 10, wherein the pre-trained weights are obtained by training the second portion configured for classifying the defects detected on the specimen.

13. The system of claim 1, wherein the one or more computer subsystems are further configured for training the neural network from scratch.

14. The system of claim 1, wherein the second portion further comprises one or more fully connected layers configured for selecting one or more of the determined features and classifying the defects based on the one or more selected features.

15. The system of claim 1, wherein the one or more computer subsystems are further configured to train the neural network by inputting class labels assigned by a user to bounding boxes in training defect images and the training defect images to the neural network.

16. The system of claim 15, wherein the one or more computer subsystems are further configured to train the neural network by inputting the class labels and the training defect images to the neural network with one or more training reference images, a design for a specimen for which the training defect images were generated, or the one or more training reference images and the design.

17. The system of claim 1, wherein the proposal network is further configured for generating bounding boxes for each of the detected defects.

18. The system of claim 17, wherein the second portion further comprises one or more region of interest pooling layers followed by one or more fully connected layers, wherein the one or more region of interest pooling layers are configured for generating fixed length representations of the generated bounding boxes, wherein the fixed length representations are input to the one or more fully connected layers, and wherein the one or more fully connected layers are configured for selecting one or more of the determined features and classifying the detected defects based on the one or more selected features.

19. The system of claim 18, wherein the one or more computer subsystems are further configured for fine tuning the one or more region of interest pooling layers and the one or more fully connected layers using the proposal network.

20. The system of claim 1, wherein the imaging subsystem is configured as an electron beam based imaging subsystem.

21. The system of claim 1, wherein e imaging subsystem is configured as an optical based imaging subsystem.

22. The system of claim 1, wherein the specimen is a wafer.

23. The system of claim 1, wherein the specimen is a reticle.

24. A system configured to detect and classify defects on a specimen, comprising:

an imaging subsystem configured for generating images of a specimen;

one or more computer subsystems configured for acquiring the images; and one or more components executed by the one or more computer subsystems, wherein the one or more components comprise:

a neural network configured for detecting defects on the specimen and classifying the defects detected on the specimen, wherein the neural network comprises:

a first portion configured for determining features of the images of the specimen generated by the imaging subsystem; and a second portion configured for detecting defects on the specimen based on the determined features of the images and classifying the defects detected on the specimen based on the determined features of the images, wherein the second portion comprises a proposal network configured for detecting defects on the specimen based on the features determined for the images, and wherein the proposal network detects the defects without classifying the defects; and wherein the one or more computer subsystems are configured for generating results of the detecting and classifying.

25. A non-transitory computer-readable medium, storing program instructions executable on one or more computer systems for performing a computer-implemented method for detecting and classifying defects on a specimen, wherein the computer-implemented method comprises:

acquiring images of a specimen generated by an imaging subsystem;

determining features of the images of the specimen by inputting the images into a first portion of a neural network configured for detecting defects on the specimen and classifying the defects detected on the specimen, wherein one or more components are executed by the one or more computer systems, and wherein the one or more components comprise the neural network;

detecting defects on the specimen based on the determined features of the images and classifying the defects detected on the specimen based on the determined features of the images by inputting the determined features of the images into a second portion of the neural network, wherein the second portion comprises a proposal network configured for detecting defects on the specimen based on the features determined for the images, and wherein the proposal network detects the defects without classifying the defects; and generating results of the detecting and classifying.

26. A computer-implemented method for detecting and classifying defects on a specimen, comprising:

acquiring images of a specimen generated by an imaging subsystem;

determining features of the images of the specimen by inputting the images into a first portion of a neural network configured for detecting defects on the specimen and classifying the defects detected on the specimen, wherein one or more components are executed by one or more computer systems, and wherein the one or more components comprise the neural network;

detecting defects on the specimen based on the determined features of the images and classifying the defects detected on the specimen based on the determined features of the images by inputting the determined features of the images into a second portion of the neural network, wherein the second portion comprises a proposal network configured for detecting defects on the specimen based on the features determined for the images, and wherein the proposal network detects the defects without classifying the defects; and generating results of the detecting and classifying.

* * * * *